(12) United States Patent
Kneckt et al.

(10) Patent No.: US 8,284,708 B2
(45) Date of Patent: Oct. 9, 2012

(54) POWER SAVE ENHANCEMENTS FOR WIRELESS COMMUNICATION DEVICES

(75) Inventors: Jarkko Kneckt, Espoo (FI); Janne Marin, Espoo (FI); Mika Kasslin, Espoo (FI); Jakub Majkowski, Helsinki (FI)

(73) Assignee: Nokia Corporation, Espoo (FI)

( * ) Notice: Subject to any disclaimer, the term of this patent is extended or adjusted under 35 U.S.C. 154(b) by 656 days.

(21) Appl. No.: 12/172,397

(22) Filed: Jul. 14, 2008

(65) Prior Publication Data
US 2010/0008274 A1 Jan. 14, 2010

(51) Int. Cl.
H04W 76/02 (2009.01)
(52) U.S. Cl. ............................................ 370/311
(58) Field of Classification Search ........... 370/311
See application file for complete search history.

(56) References Cited

U.S. PATENT DOCUMENTS

| 7,245,946 | B2 | 7/2007 | Liu |
| 2003/0231608 | A1 | 12/2003 | Wentink |
| 2005/0018624 | A1 | 1/2005 | Meier et al. |
| 2005/0114537 | A1 | 5/2005 | Griswold et al. |
| 2007/0159992 | A1 | 7/2007 | Kim |
| 2007/0161364 | A1 | 7/2007 | Surineni et al. |
| 2007/0230418 | A1 | 10/2007 | Takeuchi et al. |
| 2008/0069047 | A1 | 3/2008 | Yee et al. |
| 2008/0144559 | A1 | 6/2008 | Griswold et al. |
| 2008/0279163 | A1 | 11/2008 | Desai |
| 2009/0124301 | A1 | 5/2009 | Raissinia |
| 2009/0196212 | A1* | 8/2009 | Wentink ......................... 370/311 |
| 2010/0165896 | A1* | 7/2010 | Gong et al. .................... 370/311 |
| 2010/0271995 | A1* | 10/2010 | Seok et al. .................... 370/311 |
| 2011/0038291 | A1* | 2/2011 | Seok ............................. 370/311 |
| 2011/0072285 | A1* | 3/2011 | Fischer et al. ................. 713/320 |

FOREIGN PATENT DOCUMENTS

| EP | 1033832 A2 | 9/2000 |
| EP | 1 441 550 | 7/2004 |
| WO | WO2005069806 | 8/2005 |

OTHER PUBLICATIONS

U.S. Appl. No. 61/025,417, filed Feb. 1, 2008, Maarten Menzo Wentink.*
U.S. Appl. No. 61/025,415, filed Feb. 1, 2008, Maarten Menzo Wentink.*
U.S. Appl. No. 12/118,207, filed May 9, 2008, Naveen Kakani et al.
Hayoung Yoon et al., "iDLS: Inter-BSS Direct Link Setup in IEEE 80211 WLANS", Communications and Informations Technologies, 2007, ISCIT '07, International Symposium Jan. 10, 2007, pp. 1015-1020.
PCT International Search Report dated Oct. 14, 2009 for PCT/FI2009/050552.
Miller, M.J. et al., "Improving Power Save Protocols Using Carrier Sensing for Dynamic Advertisement Windows"; Mobile Adhoc and Sensor Systems Conference, 2005 IEEE International Conference on Nov. 7, 2005, Piscataway, N.J., USA, IEEE, Nov. 7, 2005, pp. 475-482 XP010858905; ISBN: 978-0-7803-9465-0.
The International Search Report dated Sep. 10, 2009, cited in International Application No. PCT/IB2009/051827.

* cited by examiner

*Primary Examiner* — Melvin Marcelo
(74) *Attorney, Agent, or Firm* — Locke Lord, LLP

(57) ABSTRACT

Method, apparatus, and computer program product embodiments are disclosed to enable power save modes of operation between wireless devices for direct data transfer in an infrastructure basic service set. The embodiments are an enhancement to the peer U-APSD power save mechanism. The embodiments provide additional operation for peer U-APSD mechanism with two stations operating in power save mode.

33 Claims, 14 Drawing Sheets

Fig. 5

| Order | Information | Notes |
|---|---|---|
| 1 | Link Identifier | The Link Identifier is specified in 7.3.2.z1. |
| 2 | AC0 backlogged | 1 octet field which is zero if the AC0 is empty and is non-zero otherwise |
| 3 | AC1 backlogged | 1 octet field which is zero if the AC1 is empty and is non-zero otherwise |
| 4 | AC2 backlogged | 1 octet field which is zero if the AC2 is empty and is non-zero otherwise |
| 5 | AC3 backlogged | 1 octet field which is zero if the AC3 is empty and is non-zero otherwise |
| 6 | Sequence Number | Least significant four octets of the Sequence Number of the last transmitted frame in the TDLS link of the highest AC which backlogged field was set to non-zero value |
| 7 | Number of buffered MPDUs in the highest AC | 1 octet field which presents the integer number of buffered frames in the highest AC. If more than 255 frames are buffered, the field is set to 255 |
| 8 | Peer PSM Window Indication | 1 octet field which indicates the minimum interval between successive Peer Traffic Indication frames sent to the same peer, expressed in Beacon Intervals. (Optional) |

Fig. 6

| Order | Information | Notes |
|---|---|---|
| 1 | Link Identifier | The Link Identifier is specified in 7.3.2.z1. |
| 2 | AC0 backlogged | 1 octet field which presents the number of buffered MPDUS in AC0 |
| 3 | AC1 backlogged | 1 octet field which presents the number of buffered MPDUS in AC1 |
| 4 | AC2 backlogged | 1 octet field which presents the number of buffered MPDUS in AC2 |
| 5 | AC3 backlogged | 1 octet field which presents the number of buffered MPDUS in AC3 |
| 6 | Sequence Number | Least significant four octets of the Sequence Number of the last transmitted frame in the TDLS link of the highest AC which backlogged field was set to non-zero value |
| 7 | Number of buffered MPDUs in the highest AC | 1 octet field which presents the integer number of buffered frames in the highest AC. If more than 255 frames are buffered, the field is set to 255 |
| 8 | Peer PSM Window Indication | 1 octet field which indicates the minimum interval between successive Peer Traffic Indication frames sent to the same peer, expressed in Beacon Intervals. (Optional) |

Fig. 7

| Order | Information | |
|---|---|---|
| 1 | Link Identifier | |
| 2 | AC0 backlogged | 1 octet field which is zero if the AC0 is empty and is non-zero otherwise |
| 3 | AC1 backlogged | 1 octet field which is zero if the AC1 is empty and is non-zero otherwise |
| 4 | AC2 backlogged | 1 octet field which is zero if the AC2 is empty and is non-zero otherwise |
| 5 | AC3 backlogged | 1 octet field which is zero if the AC3 is empty and is non-zero otherwise |
| 6 | TSF | 8 octets TSF field of the Peer Traffic Indication frame creation time |
| 7 | Peer PSM Window Indication | 1 octet field which indicates the minimum interval between successive Peer Traffic Indication frames sent to the same peer, expressed in Beacon Intervals. (Optional) |

Fig. 19

| Order | Information | |
|---|---|---|
| 1 | Link Identifier | |
| 2 | AC0 backlogged | 1 octet field which is zero if the AC0 is empty, set to and is non-zero otherwise |
| 3 | AC1 backlogged | 1 octet field which is zero if the AC1 is empty, set to and is non-zero otherwise |
| 4 | AC2 backlogged | 1 octet field which is zero if the AC2 is empty, set to and is non-zero otherwise |
| 5 | AC3 backlogged | 1 octet field which is zero if the AC3 is empty, set to and is non-zero otherwise |
| 6 | WTI | 1 octet filed indicating maximum time station will wait for a trigger expressed in Beacon Intervals |
| 7 | Peer PSM Window Indication | 1 octet field which indicates the minimum interval between successive Peer Traffic Indication frames sent to the same peer, expressed in Beacon Intervals. (Optional) |

POWER SAVE ENHANCEMENTS FOR WIRELESS COMMUNICATION DEVICES

FIELD

The field of the invention relates to wireless communication and more particularly to power saving in wireless communication devices.

BACKGROUND

Modern society has quickly adopted, and become reliant upon, handheld devices for wireless communication. For example, cellular telephones continue to proliferate in the global marketplace due to technological improvements in both the communication quality and device functionality. These wireless communication devices have become common for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate wireless communication over large geographic areas. These network technologies have commonly been divided by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a wireless communications device (WCD) to transmit and receive text messages of up to 160 characters, while providing data transfer to packet networks, Integrated Services Digital Network (ISDN) and Plain Old Telephone Service (POTS) users at 9.6 Kbps. The Multimedia Messaging Service (MMS), an enhanced messaging system allowing for the transmission of sound, graphics and video files in addition to simple text, has also become available in certain devices. Soon, emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced Data Rate (EDR) technology, which is also available, may enable maximum asymmetric data rates of 1448 Kbps for a 2 Mbps connection and 2178 Kbps for a 3 Mbps connection. In addition to Bluetooth™, other popular short-range wireless networks include for example IEEE 802.11 Wireless LAN, Wireless Universal Serial Bus (WUSB), Ultra Wideband (UWB), ZigBee (IEEE 802.15.4 and IEEE 802.15.4a), wherein each of these exemplary wireless mediums have features and advantages that make them appropriate for various applications The IEEE 802.11 Wireless LAN Standards describe two major components, a wireless device, called a station (STA), and a fixed access point (AP) wireless device. The AP may perform the wireless-to-wired bridging from STAs to a wired network. The basic network is the basic service set (BSS), which is a group of wireless devices that communicate with each other. An infrastructure BSS is a network that has an AP as an essential node.

The access point (AP) in legacy IEEE 802.11 Wireless LAN networks must relay all communication between the wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA.

The access point in an infrastructure BSS assists those wireless devices attempting to save power. For example two different power states may be supported by wireless devices. In the awake state the wireless device is able to transmit or receive frames and is fully powered, while in the doze state the wireless device is not able to transmit or receive and consumes very low power. In the active mode wireless device should be in the awake state all the time and the power save mode where the STAs alternates between awake and doze states. There may be further power save modes.

The legacy IEEE 802.11e Wireless LAN standards provides for support of low power operation in handheld and battery operated STAs, called automatic power save delivery (APSD). A STA currently in the power saving mode, will wake up at predetermined times to receive beacons received from the AP to listen to a traffic indication map (TIM). If existence of buffered traffic waiting to be sent to the STA is signaled through the TIM, the STA may remain awake and initiate the data transmission from the AP.

There is unscheduled automatic power save delivery (U-APSD) and scheduled automatic power save delivery (S-APSD) defined. In U-APSD, the access point is always awake and hence a STA in the power save mode can send a trigger frame to the AP when the STA wakes up, to retrieve any queued data at the AP and also transmit any data queued from the STA to the AP. In S-APSD, the AP assigns a schedule to a STA and the STA wakes up at the assigned time to retrieve from the AP any data queued for the STA. An AP can maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

A next generation IEEE 802.11 WLAN standard is being currently developed as the IEEE 802.11 TGz standard, which includes the feature of tunneled direct link setup (TDLS) with channel switching. This feature enables two wireless devices (STAs) in an infrastructure BSS to directly exchange frames of data over a direct data transfer link, without requiring the access point in the infrastructure BSS to relay the frames. However, the IEEE 802.11 TGz standard currently under development does not provide means for multiple STAs to enter into a power saving sleep mode, since the AP is no longer available to buffer the frames in the direct data transfer link between the STAs.

SUMMARY

Method, apparatus, and computer program product embodiments are disclosed to enable power save modes of operation between wireless devices for direct data transfer in an infrastructure BSS.

The embodiments are an enhancement to the peer U-APSD power save mechanism. The embodiments provide additional operation for peer U-APSD mechanism with two STAs operating in power save mode. The embodiments do not add more complexity to the peer U-APSD mechanism since the peer traffic indication (PTI) frame is reused.

The embodiments enhance the service period triggering rules, in cases where indication of the buffered frames is transmitted through the access point. The embodiments include the access category information of the buffered frame(s) and the number of the buffered frames in the access category and the sequence number of the last transmitted frame in the direct link to the PTI frame, to avoid unnecessary triggering. Further, the embodiments enable the transmissions of the PTI frame to the peer STA without preconfigured times.

Alternate embodiments include the timing synchronization function (TSF) time stamp of the PTI frame creation time in the PTI frame.

The embodiments introduce information in a peer traffic indication frame that is sent via an intermediate point (e.g. access point) to a peer STA, which allows the peer STA to detect duplicated or invalid identifications. Based on the detection, it is decided if there is a need for direct communication with the originator STA of the message. In addition, the embodiments allow both STAs that are configured for direct communication, to be in power save mode at the same time.

As a result, the sequence number reference or frame creation time is used in PTI frame may reduce unnecessary triggering. The embodiments allow both STAs could be in the power save mode. There is no need that one STA has to be stay in active mode for direct communication.

DESCRIPTION OF THE FIGURES

FIG. 5 illustrates an example peer traffic indication frame (Option 1).

FIG. 6 illustrates an example peer traffic indication frame (Option 2).

FIG. 7 illustrates an example peer traffic indication frame (Option 3).

FIG. 19 is an example of waiting time interval for peer traffic indication frames.

DISCUSSION OF EXAMPLE EMBODIMENTS OF THE INVENTION

U.S. patent application Ser. No. 12/118,207 to Naveen Kakani and Jakub Majkowski, filed May 9, 2008, entitled "Power Save Mechanism For Wireless Communication Devices", is incorporated herein by reference for its disclosure of various related power save modes of operation between wireless devices.

Method, apparatus, and computer program product embodiments disclosed herein enable power save modes of operation between wireless devices for direct data transfer in an infrastructure BSS. The embodiments are an enhancement to the peer U-APSD power save mechanism. The embodiments provide additional operation for peer U-APSD mechanism with two STAs operating in power save mode. There are two power save mechanisms peer U-ASPD and peer power save (PS) mechanism. It is likely that these mechanisms will merge in the future and peer traffic indication (PTI) principles will be the same as described here.

Let us assume that two stations STA1 and STA2 support Peer U-APSD power save mode and after the setup of direct link (DL) also known as direct data transfer link they both want to operate in power save mode. The example embodiments define new logic to be followed by the station in active mode to enter power save mode and describes how frame exchange between two stations in power save mode is handled.

If STA2 wants to enter power save (PS) mode it might transmit a frame with power management (PM) field set to 1 to STA1. The power management field is in an exemplary embodiment 1 bit in length and is used to indicate the power management mode of a STA. The value of this field remains constant in each frame from a particular STA within a frame exchange sequence. The value indicates the mode in which the STA will be after the successful completion of the frame exchange sequence. A value of 1 indicates that the STA will be in PS mode. A value of 0 indicates that the STA will be in active mode. This field might be always set to 0 in frames transmitted by an AP.

Figure 2:
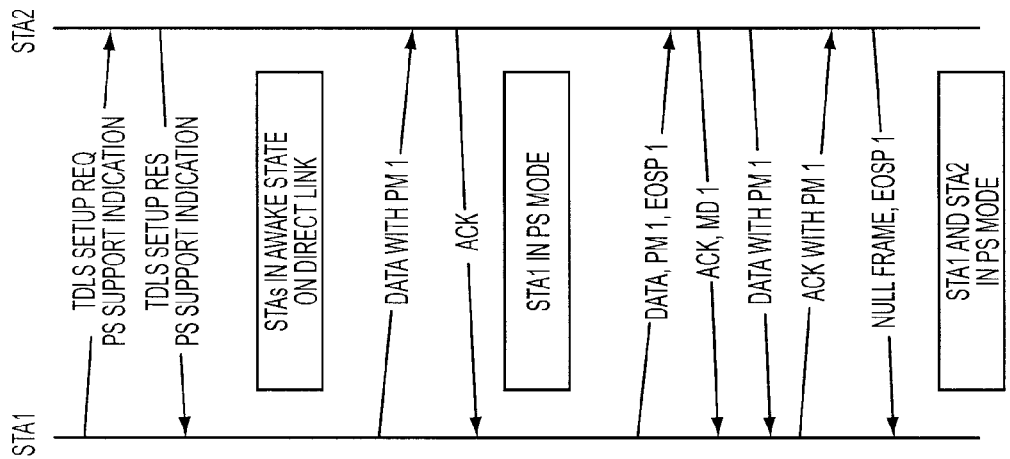
FIG. 2 is an example signaling diagram of entering power save mode in a service period triggered by station in power save mode.
Figure 1:
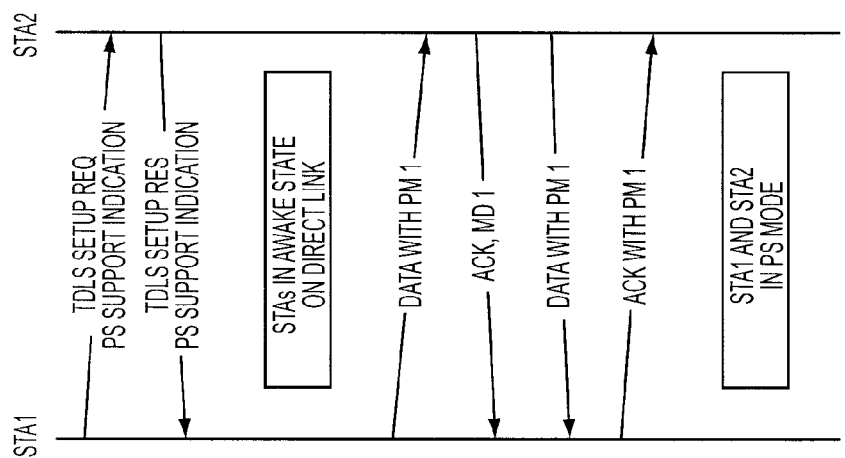
FIG. 1 is an example signaling diagram of successive entering into power save mode.
Figure 3:
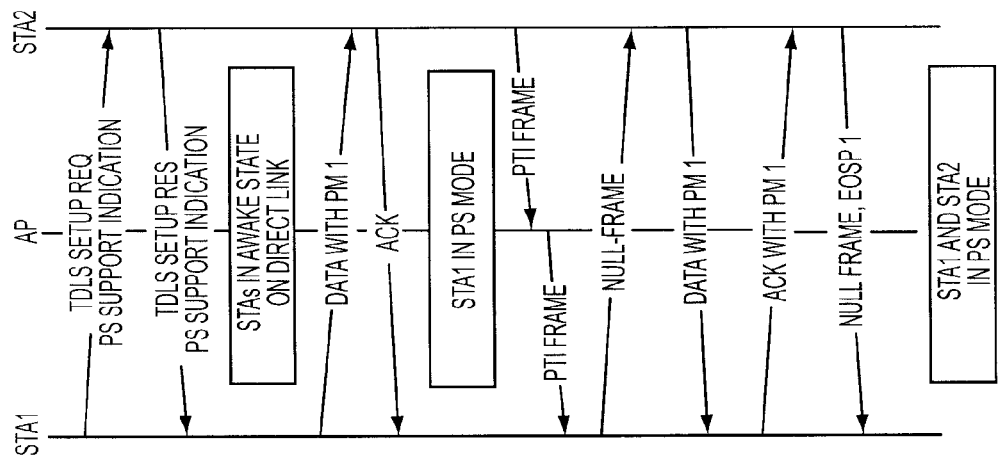
FIG. 3 is an example signaling diagram of entering power save mode in a service period explicitly request by station in active mode.

The transmission of a frame with PM bit set to 1 from STA2 towards the STA1 should be done while STA1 is in awake state. Consequently, STA2 transmission with PM bit set to 1:

1) can directly follow STA1 announcement of entering PS mode and just before STA1 enters for the first time into doze state see FIG. 1, or 2) can happen within a service period triggered by STA1 over the direct link see FIG. 2, or 3) can happen in a service period explicitly requested by STA2 via the AP path see FIG. 3.

FIG. 1 presents an example situation when STA1 first announces its entering into power save mode and in the next frame exchange STA2 indicates it also goes to PS mode. In order for STA2 to indicate that it wants to enter PS mode it does following things:

sets more data (MD) bit to one in acknowledge (ACK) frame for data frame in which STA1 sets its PM bit to 1 (to indicate it has still more packets to be transmitted to STA 1)

it sends data or null frame with PM bit set to 1 after reception of ACK for it frame with PM bit set to 1 both stations can go to PS mode.

FIG. 2 presents an example situation when STA1 entered first PS mode and STA2 wants to enter PS mode after some time. The procedure that STA2 has to follow in order to enter PS mode is the same as in the previous case with successive PS mode entering. End of session period (ESOP) is identified with EOSP bit set to 1 via a frame when no further data are buffered. The null frame contains no data.

FIG. 3 presents an example situation when STA1 entered first PS mode and STA2 wants to enter PS mode after some time. In order to enter PS mode STA2 transmits a PTI frame over the AP path indicating to STA1 it has packets for it. In response to PTI frame STA1 triggers a service period and so similar logic as in previous cases applies.

Figure 4:
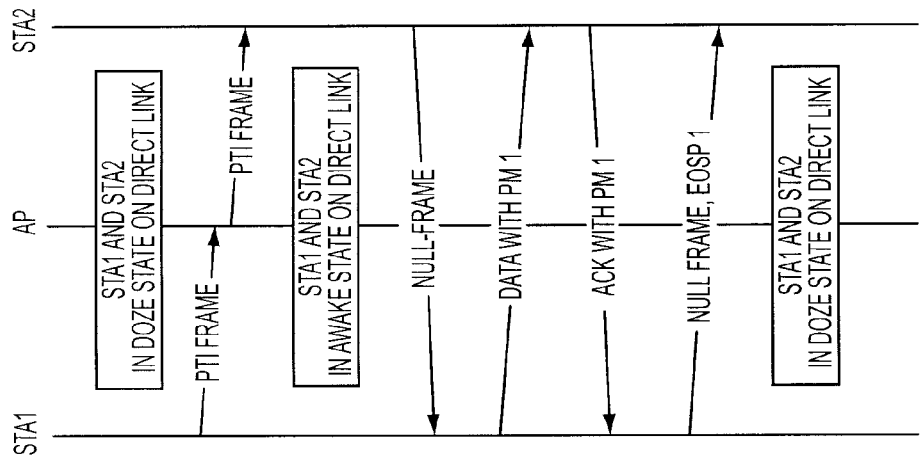
FIG. 4 is an example data transmission signaling diagram with both stations in power save mode.

While both peer STAs in direct link operate in PS mode each data exchange over the direct link should be done in a service period requested by one of the stations over the AP path and triggered by the other station over the direct link. Additionally, Peer power save mode (PSM) indication window can be used to reduce the number of triggering over the AP path as defined in the 802.11z draft 1.0. The exemplary signaling for service period (SP) initiation is shown in FIG. 4. In FIG. 4 STA1 wants to send some data to STA2 and in order to do it, it sends a PTI frame to STA1 over the AP path, when STA2 receives the packet it sends a trigger frame to STA1 to initiate a service period and hence data transmission or data exchange between two stations can follow. The data transmission might include data frames, null frames or other types of frames.

FIG. 4 presents an exemplary signaling diagram when both stations are in PS mode while using Peer U-APSD. It shows a usage of PTI frame to start service period and data transmission.

The PTI frame should include at least one of the following elements the access category information of the buffered frame(s) and the number of the buffered frames in the access category and the sequence number of the last transmitted frame in the direct link. Exemplary embodiments of PTI frame and its elements are shown in FIGS. 5 and 6.

The STA which transmitted the PTI frame should remain in awake state until it has received a trigger frame from the target peer STA which is the recipient of the PTI frame. If the triggering is not performed within preconfigured time limit, the peer link may be considered to be terminated and the frames may be transmitted through the AP.

The STA which receives the PTI frame verifies the received PTI frame. It may calculate the sequence number of the newest frame which will be transmitted over direct link and decide if it has already received that data frame(s) from the transmitting STA or not. If it has received the indicated frame the PTI frame is identified as outdated.

When the target peer STA receives the PTI frame it should trigger the originator of the frame, unless it has received a frame with larger or equal sequence number from the access category from the transmitter of PTI frame.

The PTI frame transmission might be triggered by an implementation of a specific logic. There is no restrictions or limits for the shortest duration, for the PTI indication transmission. The indication should be transmitted, if frames have been buffered over a preconfigured time limit.

Another embodiment is to include the TSF time stamp of the PTI frame creation time to the PTI frame. If the receiver has triggered later than the time specified in TSF of the PTI frame, it may ignore the PTI frame. The FIG. 7 shows PTI frame according to another exemplary embodiment.

FIG. 5 illustrates an example of a PTI frame. Order 6 information is the sequence number. The least significant four octets of the sequence number of the last transmitted frame in the TDLS link of the highest access category (AC) which backlogged field was set to non-zero value. Order 7 information is the number of buffered MPDUs in the highest AC. The 1 octet field presents the integer number of buffered frames in the highest AC. If more than 255 frames are buffered, the field is set to 255.

FIG. 6 illustrates another example PTI frame. Order 6 information is the sequence number. The least significant four octets of the sequence number of the last transmitted frame in the TDLS link of the highest access category which backlogged field was set to non-zero value. Order 7 information is the number of buffered MPDUs in the highest access category. The 1 octet field presents the integer number of buffered frames in the highest AC. If more than 255 frames are buffered, the field is set to 255.

FIG. 7 illustrates a further example PTI frame. Order 6 information is the time stamp field (TSF). The 8 octets TSF field presents the time instant of the PTI frame creation time.

Figure 8:
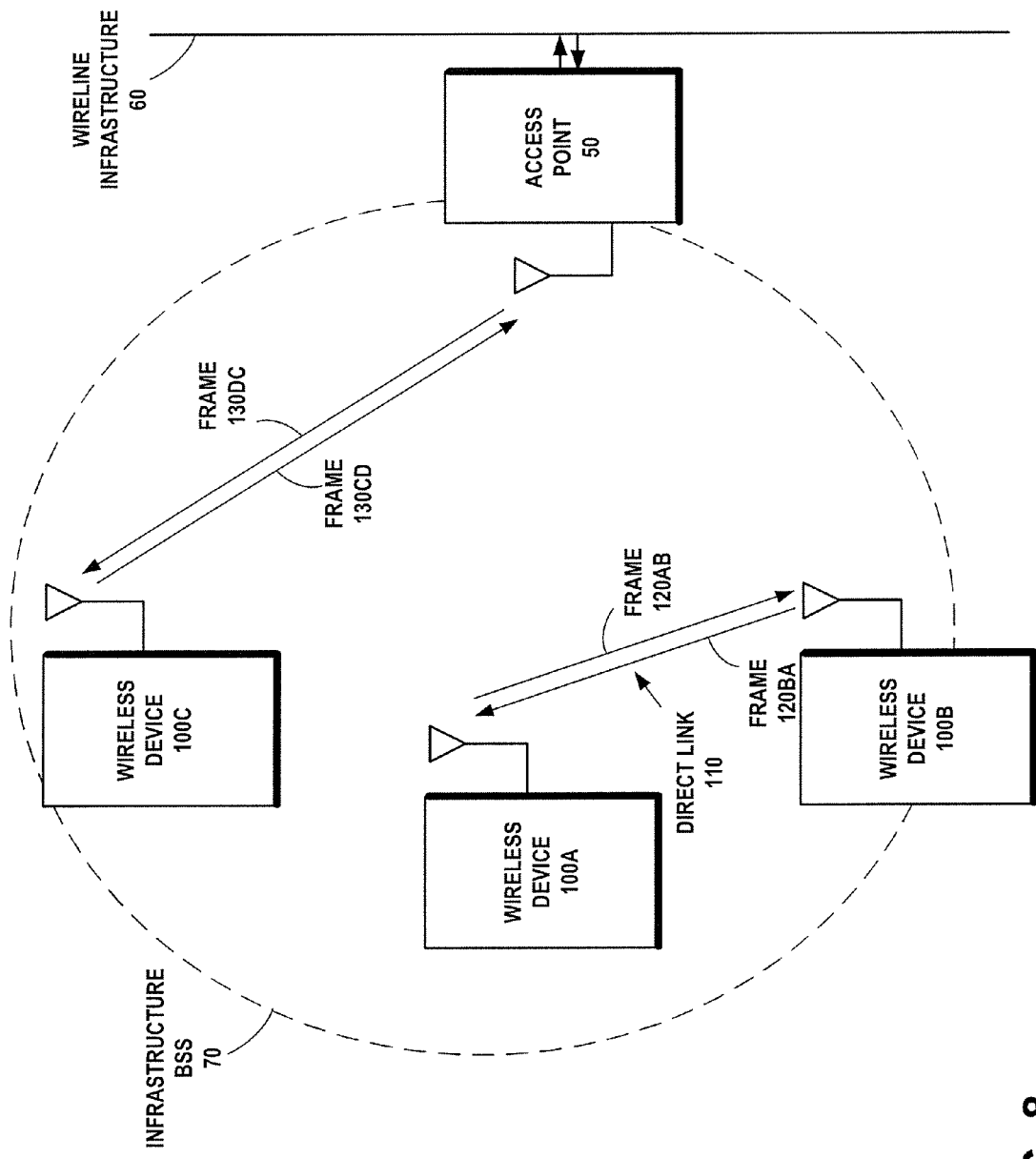
FIG. 8 is an example network diagram of an infrastructure BSS network, with three wireless devices and an access point, which performs wireless-to-wired bridging from the STAs to a wired infrastructure network.

FIG. 8 is an example embodiment network diagram of an exemplary infrastructure BSS network 70, with three wireless devices (STAs) 100A, 100B, and 100C and an access point (AP) 50, which performs wireless-to-wired bridging from the STAs 100A, 100B, and 100C to a wired infrastructure network 60. The STAs 100A, 100B, and 100C may operate under the IEEE 802.11 TGz WLAN standard, which includes the feature of direct link setup (DLS). DLS enables the STAs 100A, 100B, and 100C in the infrastructure BSS 70 to directly exchange frames of data over a direct data transfer link, without requiring the access point (AP) 50 in the infrastructure BSS to relay the frames. For example, FIG. 8 shows the STAs 100A and 100B directly exchanging frames of data 120AB and 120BA over the direct data transfer link 110 according to the IEEE 802.11 TGz WLAN standard. The access point 50 can, for example, operate under a legacy WLAN standard, such as the IEEE 802.11e Wireless LAN standard according to at least one embodiment. For example, FIG. 8 shows the STA 100C and the AP 50 exchanging frames of data 130DC and 130CD in accordance with the IEEE 802.11e WLAN standard. In addition to the access point (AP) 50 performing the wireless-to-wired bridging from the wireless devices 100A and 100B to the wired infrastructure network 60, the access point 50 can also relay communications between the wireless devices 100A, 100B, and 100C in the infrastructure BSS 70.

Figure 9:
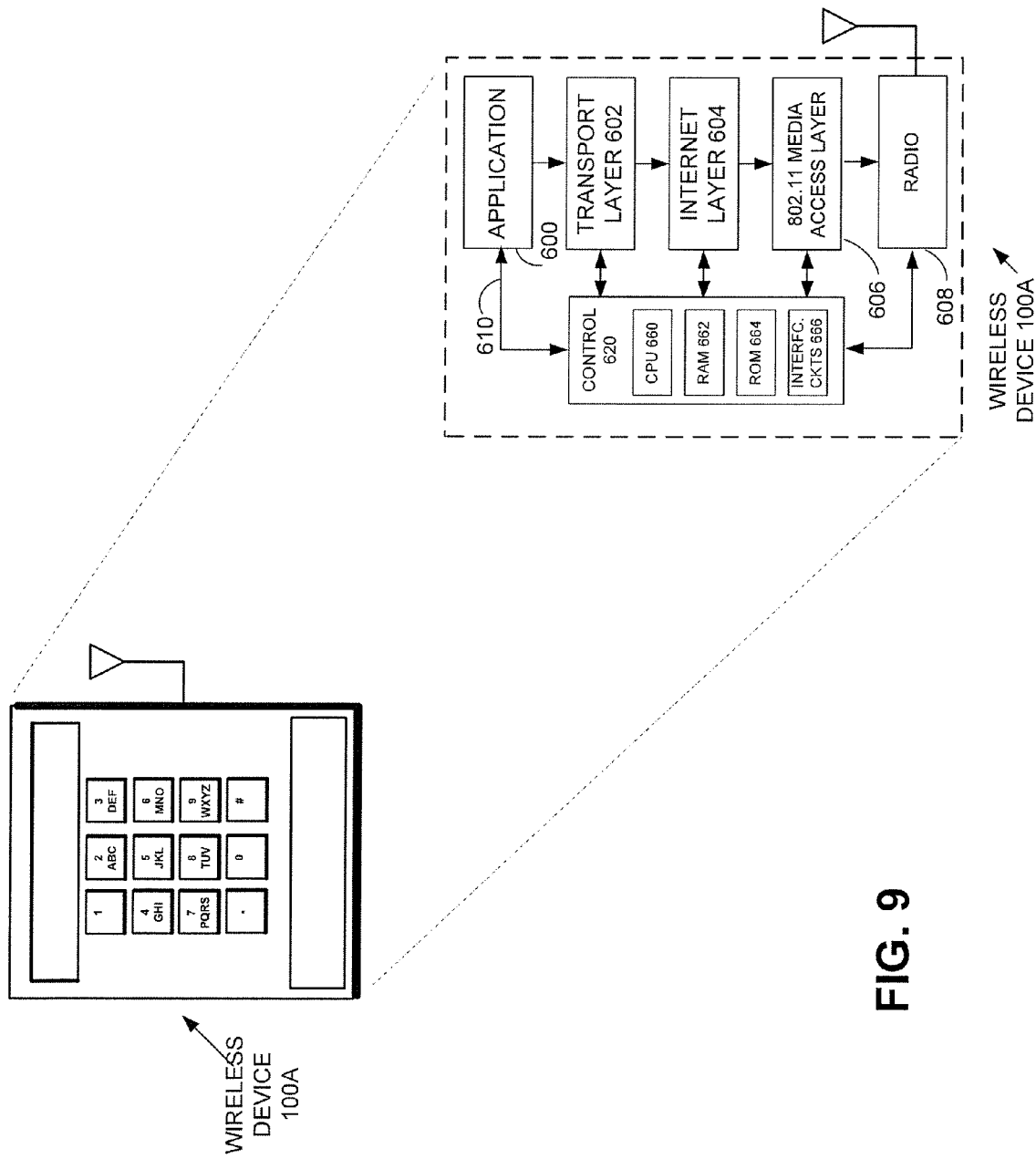
FIG. 9 illustrates an external view and a functional block diagram of an example embodiment of the wireless device.

FIG. 9 illustrates an external view and a functional block diagram of an example embodiment of the wireless device (STA) 100A. The wireless device 100A may be a communications device, PDA, cell phone, laptop or palmtop computer, or the like. The wireless device 100A includes a control module 620, which includes a central processing unit (CPU) 660, a random access memory (RAM) 662, a read only memory (ROM) 664, and interface circuits 666 to interface with the radio transceiver 608, battery and other power sources, key pad, touch screen, display, microphone, speakers, ear pieces, camera or other imaging devices, etc. in the devices 100A, 100B, and 100C. The RAM 662 and ROM 664 can be removable memory devices such as smart cards, SIMs, WIMs, semiconductor memories such as RAM, ROM, PROMS, flash memory devices, etc. The wireless device 100A includes for example an Internet protocol stack that includes the user's application program 600 at the top, the Transmission Control Protocol (TCP) transport layer 602, and the Internet Protocol (IP) layer 604, the 802.11 Media Access Control (MAC) layer 606, and the radio transceiver physical layer 608 at the bottom of the protocol stack. The 802.11 MAC layer provides functionality to allow reliable data delivery for the upper layers over the wireless medium. The 802.11 MAC layer uses the IEEE 802.11 TGz standard, which includes the feature of direct link setup. The device might support other upper layer protocols like User Datagram Protocol (UDP).

The control module 620, internet protocol stack layers 602, 604, 606, and/or application program 600 can be embodied as program logic stored in the RAM 662 and/or ROM 664 in the form of sequences of programmed instructions which, when executed in the CPU 660, carry out the functions of the disclosed embodiments. The program logic can be delivered to the writeable RAM, PROMS, flash memory devices, etc. 662 of the wireless device 100A from a computer program product or article of manufacture in the form of computer-usable media such as resident memory devices, smart cards or other removable memory devices, or in the form of program logic transmitted over any transmitting medium which transmits such a program. Alternately, they can be embodied as integrated circuit logic in the form of programmed logic arrays or custom designed application specific integrated circuits (ASIC). The radio 608 in wireless device 100A can be separate transceiver circuits or alternately, the radio 608 can be a single radio module capable of handling one or multiple channels in a high speed, time and frequency multiplexed manner in response to the control module 620.

Figure 10:
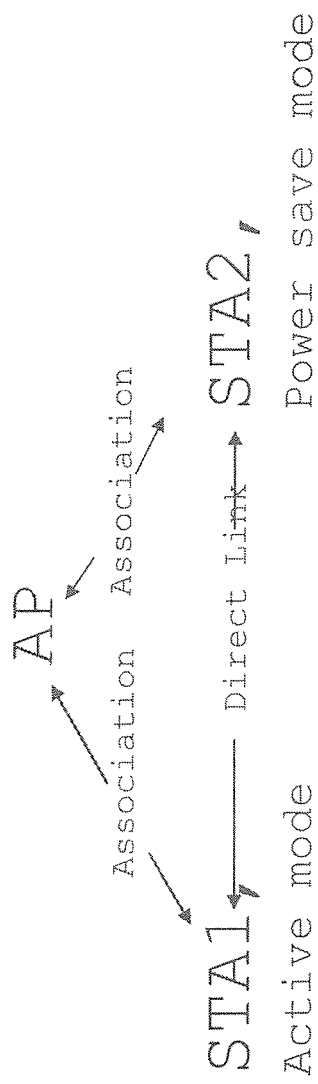
FIG. 10 shows an example direct link setup

FIG. 10 shows an example direct link setup (DLS). STA2 in power save may trigger the STA1 at any time. The triggering will initialize a direct link service period which is used for data transmission. STA1 may transmit frames directly to STA2 only during a direct link service period. STA 1 may use AP as gateway or relay element to distribute frames to STA2, i.e. all frames are transmitted through the AP or it may transmit a peer traffic indication frame indicating that it has buffered frames and expects triggering from STA2.

Figure 11:
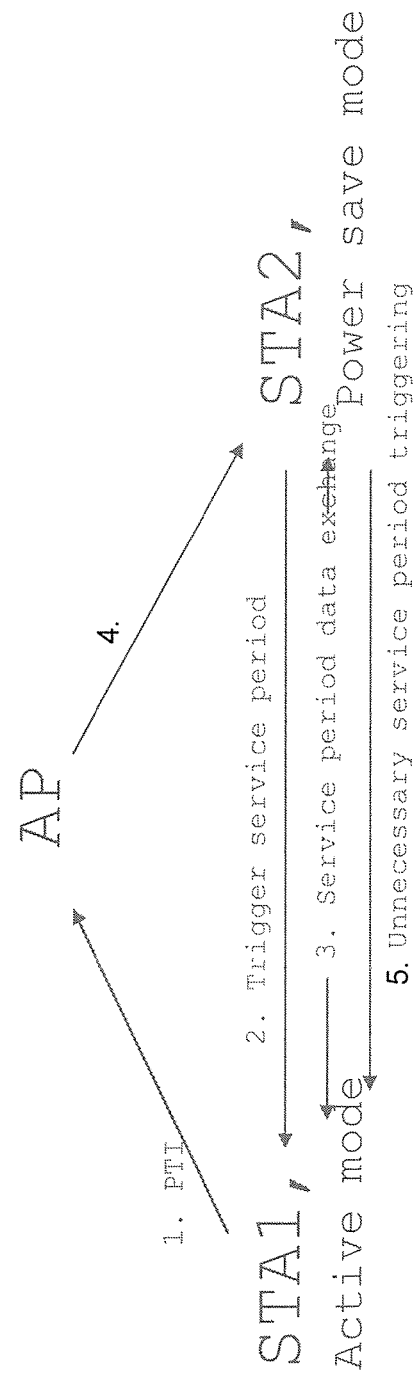
FIG. 11 illustrates a problem of a peer traffic indication frame handling.

FIG. 11 illustrates a problem of peer traffic indication frame handling.

Let's assume the following case:

1. Active STA (STA1) has transmitted a PTI frame through AP to peer STA (STA2) in power save mode.

2. Peer STA in power save mode decides to trigger the active mode STA before it gets PTI frame from AP.

3. Service period between active and power save peer STAs is performed and finalized.

4. The power saving peer STA gets indication of buffered traffic in AP through the beacon.

5. The power saving peer STA gets PTI from AP

6. Because of the received "old" PTI frame, power save STA triggers active STA, even when all traffic is transmitted between the STAs.

Figure 12:
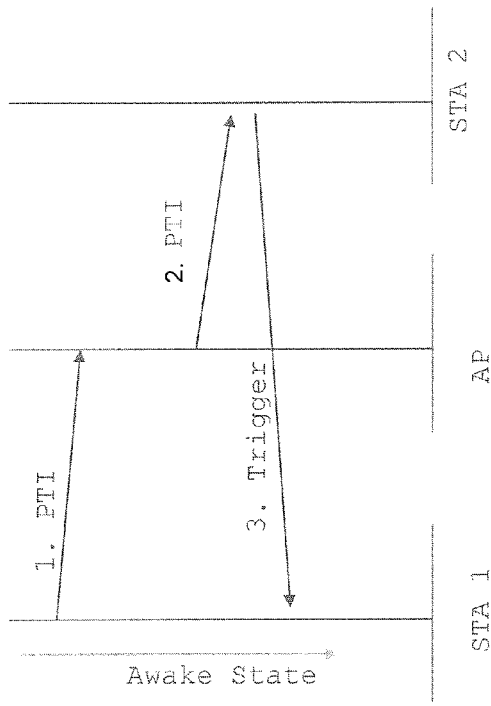
FIG. 12 is an example of operation of the power save STA1 after it transmits a peer traffic indication frame.

This operation is likely to occur, because beacon transmission periodicity could be for example every 100 ms and frames delivery through AP may have additional delays due not optimal access point implementation, FIG. 12 is an example of operation of the power save STA1 after it transmits a peer traffic indication frame. Let's assume the following scenario:

STA1 in power save mode (operates in awake state) has transmitted a PTI frame through AP to peer STA2 in power save mode (may operate in doze state).

STA1 remains in awake state and waits for service period triggering from STA2. (if no triggering occurs within preconfigured time, STA1 may assume that TDLS link to STA2 is broken and use AP to forward frames between the STAs).

STA2 triggers, a service period is initiated and STA1 may return to doze state after the completion of the service period.

Figure 13:
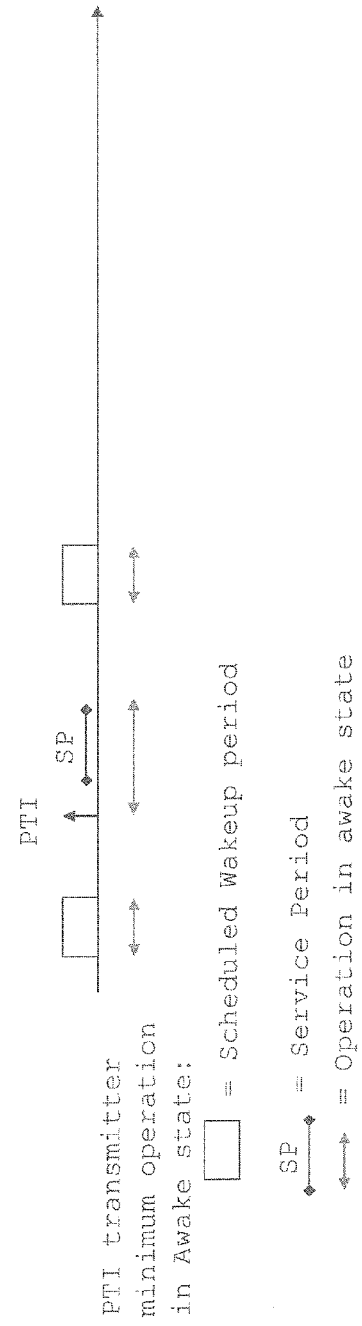
FIG. 13 is an example of peer traffic indication handling when scheduled awake periods are used.

FIG. 13 is an example of PTI handling when scheduled awake periods are used. The same operation may be performed, if STAs are using wakeup windows for the TDLS link. In FIG. 13 the STA notices that scheduled awake period occurs only after very long time. The STA sends PTI through AP and remains to operate in awake state. Peer STA triggers the STA that transmitted PTI frame and after the service period is completed the transmitter of the PTI frame may return to doze state. The PTI frame may also be used, if the peer STA fail to send a trigger frame within the scheduled wakeup window (due heavy traffic, etc). As described in explanations for FIG. 12, after PTI frame transmission there is no awake period timeout, during which the triggering should occur.

Figure 14:
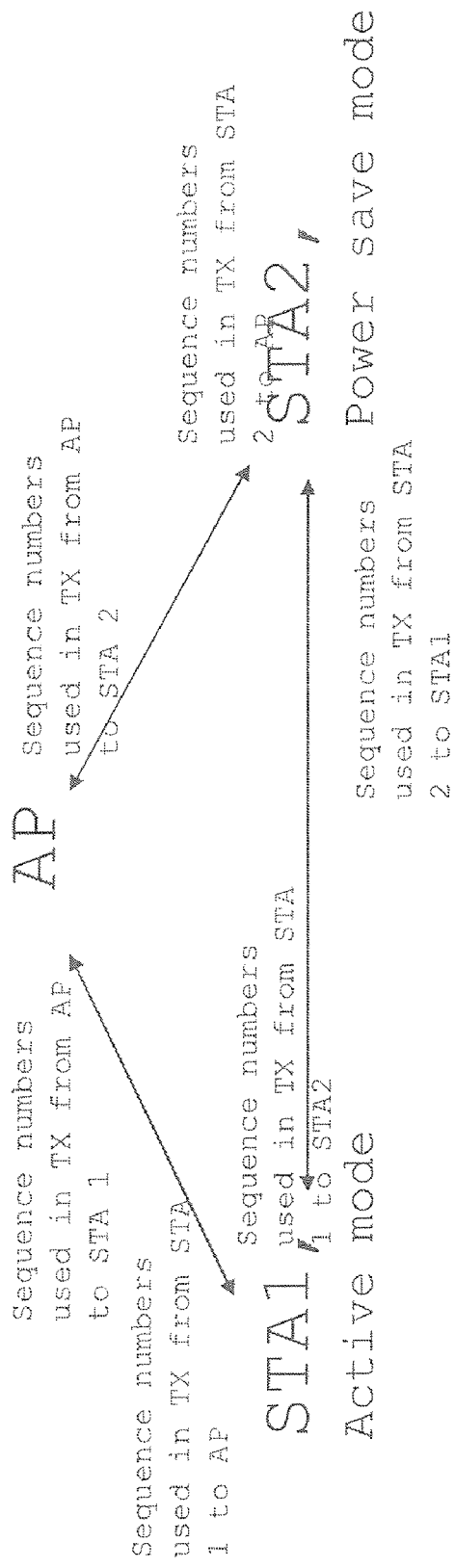
FIG. 14 is an example of setting sequence numbers for peer traffic indication.

FIG. 14 is an example of setting sequence numbers for PTI. Every node maintains sequence number set (one sequence number for one Traffic ID, TID or access category or per access category) for all links. The sequence numbers provided in peer traffic indication from STA1 to STA2 are the sequence numbers used in data transmission from STA1 to STA2.

Figure 15:
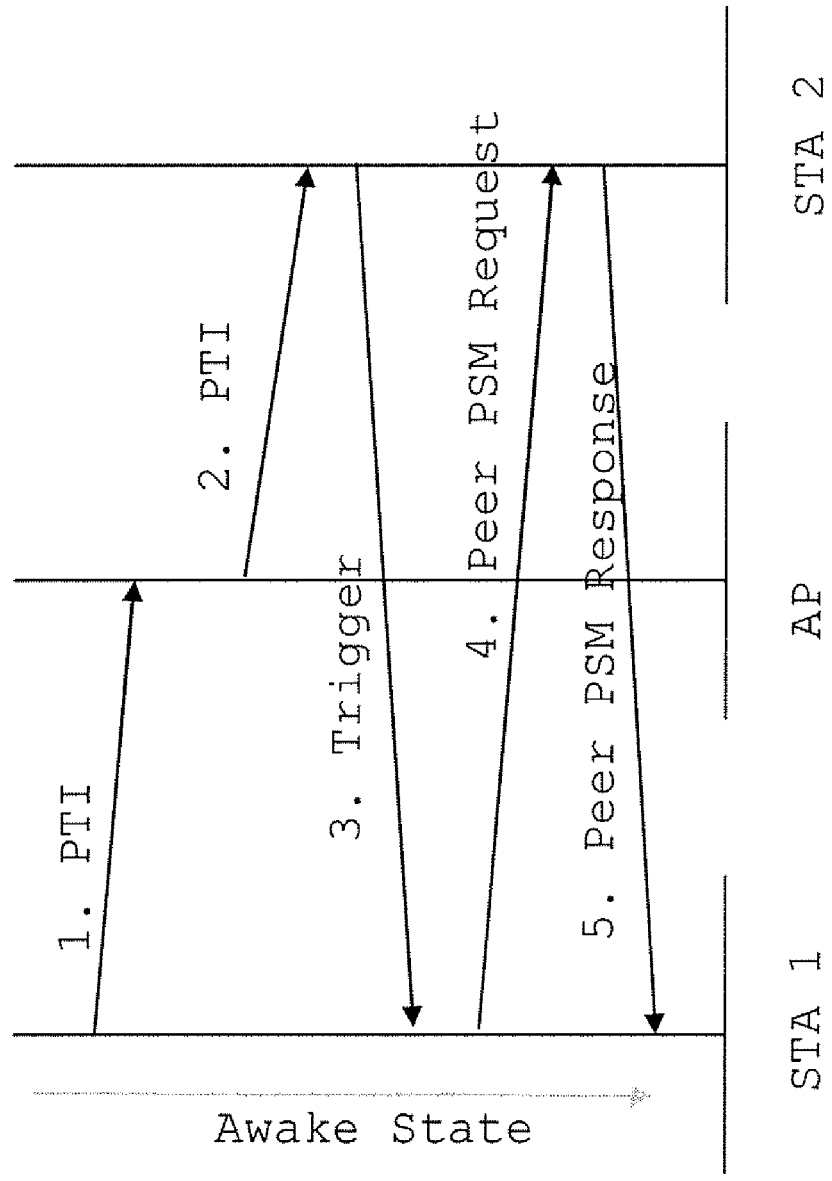
FIG. 15 is an example of usage of peer traffic indication frame for wakeup schedule activation.

FIG. 15 is an example of usage of PTI frame for wakeup schedule activation. If a STA1 wants to activate a direct link and/or a wakeup schedule with a peer station, STA2, the STA1 should send a PTI frame through the AP path to STA2. As described with the figure, the STA1 should remain in awake state to wait for trigger frame from the STA2. After STA2 has received the PTI frame, it should send the trigger to request the initiation of a service period with STA1. The triggered service period may be used for a negotiation of the new wakeup schedule between peer STAs with peer power save mode (PSM) request and response frames.

Figure 16:
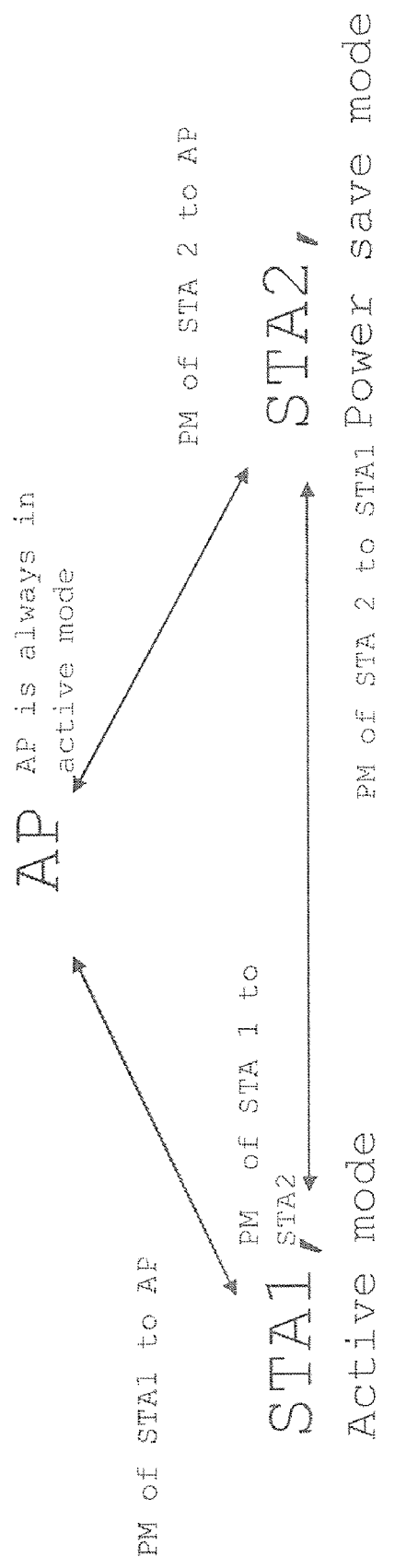
FIG. 16 is an example of power management modes.

FIG. 16 is an example of power management modes. The STAs may indicate power management modes separately for each link. For instance STA2 does not receive frames which are transmitted between STA1 and AP and thus, it has no understanding of the power management mode used in this link.

The power management field is for example 1 bit in length and is used to indicate the power management mode of a STA. The value of this field remains constant in each frame from a particular STA within a frame exchange sequence. In case of a STA in a BSS, the value indicates the mode in which the station will be after the successful completion of the frame exchange sequence. A value of 1 indicates that the STA will be in power save mode. A value of 0 indicates that the STA will be in active mode. This field is for example set to 0 in frames transmitted by an AP.

Figure 17:
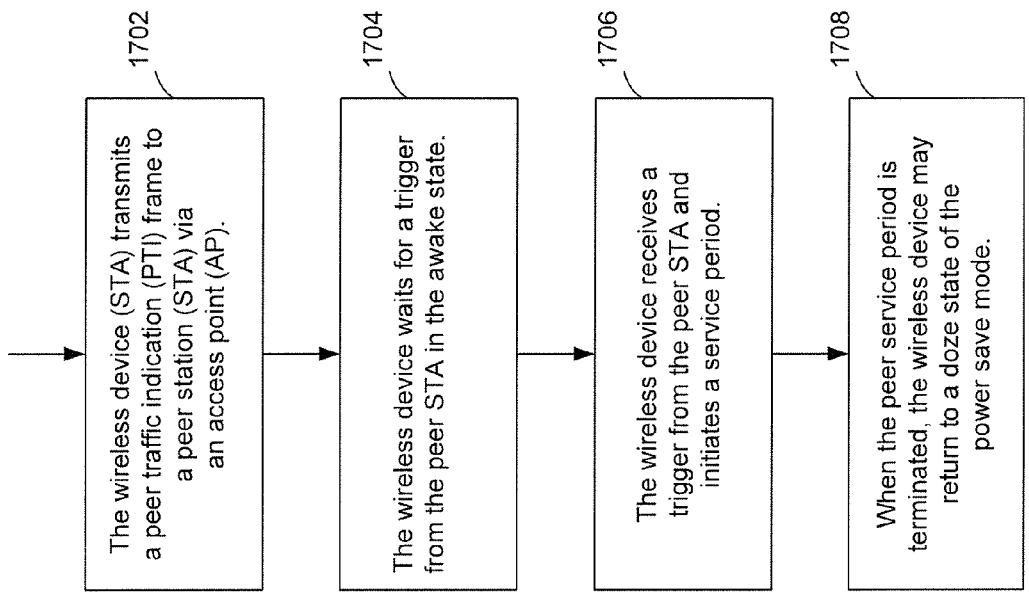
FIG. 17 is an example of a method of the peer traffic indication transmitter operation.

FIG. 17 is an example of a method of the peer traffic indication transmitter operation. Example steps of the method are as follows:

Step 1702: The wireless device (STA) transmits a peer traffic indication (PTI) frame to a peer station (STA) via an access point (AP).

Step 1704: The wireless device waits for a trigger from the peer STA in the awake state.

Step 1706: The wireless device receives a trigger from the peer STA and initiates a service period.

Step 1708: When the peer service period is terminated, the wireless device may return to a doze state of the power save mode.

Figure 18:
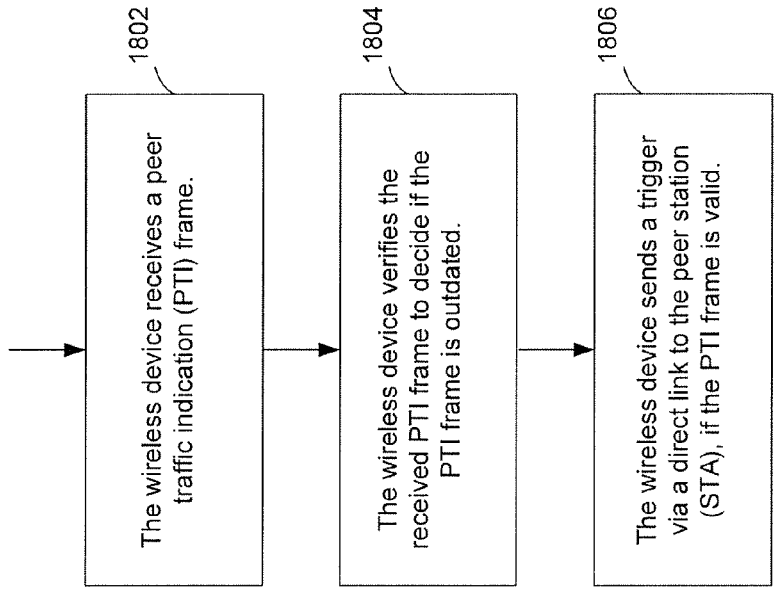
FIG. 18 is an example of a method of the peer traffic indication receiver operation.

FIG. 18 is an example of a method of the peer traffic indication receiver operation. Example steps of the method are as follows:

Step 1802: The wireless device receives a peer traffic indication (PTI) frame.

Step 1804: The wireless device verifies the received PTI frame to decide if the PTI frame is outdated.

Step 1806: The wireless device sends a trigger via a direct link to the peer station (STA), if the PTI frame is valid.

FIG. 19 discloses an example of waiting time interval (WTI) for PTI in accordance with at least one example embodiment of the present invention. In at least one scenario, the waiting time indication may comprise at least a time counter maintained by the originator of a PTI frame specified in, for example, beacon intervals. The WTI may define the maximum time that the PTI originator will be in an awake state awaiting the trigger over the direct link from its peer station. This additional functionality may become especially important when direct link is operated in the frequency other than the one used by the AP to which both stations are associated. In addition, it may be possible to define the wait interval in terms of an amount of wake-up intervals (e.g., how many empty wake-up intervals the device waits for triggering). In at least one example configuration, the signaling for the maximum wait time may further be performed in direct link setup signaling so that the same timeout may be utilized for the entire duration of the direct link.

The embodiments can be implemented to provide for power saving at STAs that are peer STAs on a direct data transfer link that is operating either in the same band as the AP or in a different band.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:
   transmitting, by an apparatus, an indication for a required direct link service period to a wireless device;
   the transmitted indication including at least one of access category information of at least one buffered frame and reference to a last transmitted frame via the direct link; and
   receiving from the wireless device, a trigger signal based on the indication, the trigger signal indicating that the next direct link service period can be started, so that data exchange via the direct link can be initiated.

2. The method of claim 1 wherein the apparatus is in an awake state until the trigger signal is received via the direct link.

3. The method of claim 1, wherein if the apparatus and the wireless device are in power save mode with the direct link deactivated, the direct link is activated by the transmission of the indication.

4. The method claim 1, wherein the apparatus is a member of an infrastructure basic service set, and coordinate entering into a power save mode over the direct link.

5. The method of claim 1, wherein the indication includes a time stamp of a frame creation time for the indication, and if the wireless device has triggered later than the time specified by the time stamp, it may ignore the indication.

6. The method of claim 1, wherein the transmitted indication is transmitted in a peer traffic indication frame.

7. The method of claim 1, wherein the trigger signal is received from the wireless device over the direct link.

8. The method of claim 1, wherein the reference to a last transmitted frame is a sequence number.

9. An apparatus, comprising:
   a transceiver; and
   a processor configured to control the operation of the transceiver to:
      transmit an indication for a required direct link service period to a wireless device;
      the transmitted indication including at least one of access category information of at least one buffered frame and reference to a last transmitted frame via the direct link; and
      receive from the wireless device, a trigger signal based on the transmitted indication, the trigger signal indicating that the next direct link service period can be started, so that data exchange via the direct link can be initiated.

10. The apparatus of claim 9, wherein the apparatus is configured to operate according to the IEEE 802.11 communication protocol standard.

11. The apparatus of claim 9, wherein the apparatus is a member of an infrastructure basic service set, and configured to coordinate entering into a power save mode over the direct link.

12. The apparatus of claim 9, wherein the apparatus is configured to stay in an awake state until the trigger signal is received via the direct link.

13. The apparatus claim 9, wherein the apparatus and the wireless device are configured to stay in power save mode with the direct link deactivated, the direct link is activated by the transmission of the indication.

14. The apparatus of claim 9, wherein the transmitted indication is transmitted in a peer traffic indication frame.

15. The apparatus of claim 9, wherein the trigger signal is received from the wireless device over the direct link.

16. The apparatus of claim 9, wherein the indication includes a time stamp of a frame creation time for the indication, and if the wireless device has triggered later than the time specified by the time stamp, it may ignore the indication.

17. A computer program product, comprising:
a non-transitory computer readable medium configured to store program instructions, which when executed by an computer processor, perform the steps of:
transmitting, by an apparatus, an indication for a required direct link service period to a wireless device;
the transmitted indication including at least one of access category information of at least one buffered frame and reference to a last transmitted frame via the direct link; and
receiving from the wireless device, a trigger signal based on the transmitted indication, the trigger signal indicating that the next direct link service period can be started, so that data exchange via the direct link can be initiated.

18. An apparatus, comprising:
means for transmitting an indication for a required direct link service period to a wireless device;
the transmitted indication including at least one of access category information of at least one buffered frame and reference to a last transmitted frame via the direct link; and
means for receiving from the wireless device, a trigger signal based on the transmitted indication, the trigger signal indicating that the next service period can be started, so that data exchange via the direct link can be initiated.

19. An apparatus, comprising:
a transceiver; and
a processor configured to control the operation of the transceiver to:
receive an indication for a required direct link service period from a wireless device;
the indication including at least one of access category information of at least one buffered frame and reference to a last transmitted frame in the direct link; and
send to the wireless device, a trigger signal based on the indication, the trigger signal indicating that the next direct link service period can be started, so that the wireless device can initiate data exchange via the direct link.

20. The apparatus of claim 19, wherein the apparatus is configured to operate according to an IEEE 802.11 communication protocol standard.

21. The apparatus of claim 19, wherein the apparatus is a member of an infrastructure basic service set, and configured to coordinate entering into a power save mode over the direct link.

22. The apparatus of claim 19, wherein the trigger signal is generated only if the indication is not outdated.

23. The apparatus of claim 19, wherein the wireless device is in an awake state until the trigger signal is received via the direct link.

24. The apparatus claim 19, wherein if the apparatus and the wireless device are in power save mode with the direct link deactivated, the direct link is activated by the transmission of the indication.

25. The apparatus of claim 18, wherein the trigger signal is sent over the direct link.

26. An apparatus, comprising:
means for receiving an indication for a required direct link service period from a wireless device;
the indication including at least one of access category information of at least one buffered frame and reference to a last transmitted frame in the direct link; and
means for sending to the wireless device, a trigger signal based on the indication, the trigger signal indicating that the next direct link service period can be started, so that the wireless device can initiate data exchange via the direct link.

27. A method, comprising:
receiving in an apparatus an indication for a required direct link service period from a wireless device;
the indication including at least one of access category information of at least one buffered frame and reference to a last transmitted frame via the direct link; and
sending to the wireless device, a trigger signal based on the indication, the trigger signal indicating that the next direct link service period can be started, so that the wireless device can initiate data exchange via the direct link.

28. The method of claim 27, wherein the trigger signal is generated only if the indication is not outdated.

29. The method of claim 27, wherein if the apparatus and the wireless device are in power save mode with wakeup schedule deactivated, the wakeup schedule is activated by the transmission of the indication.

30. The method of claim 27, wherein the indication coordinates returning from a power save mode.

31. The method of claim 27, wherein the trigger signal is sent over the direct link.

32. The method of claim 27, wherein the reference to a last transmitted frame is a sequence number.

33. A computer program product, comprising:
a non-transitory computer readable medium configured to store program code executable by a computer processor;
program code in the computer readable medium for receiving in an apparatus an indication for a required direct link service period from a wireless device;
the indication including at least one of access category information of at least one buffered frame and reference to a last transmitted frame via the direct link; and
program code in the computer readable medium for sending to the wireless device, a trigger signal based on the indication, the trigger signal indicating that the next service period can be started, so that the wireless device can initiate data exchange via the direct link.

* * * * *

UNITED STATES PATENT AND TRADEMARK OFFICE
CERTIFICATE OF CORRECTION

| | |
|---|---|
| PATENT NO. | : 8,284,708 B2 |
| APPLICATION NO. | : 12/172397 |
| DATED | : October 9, 2012 |
| INVENTOR(S) | : Kneckt et al. |

It is certified that error appears in the above-identified patent and that said Letters Patent is hereby corrected as shown below:

In the Claims

Column 10, Claim 13

Line 58, "The apparatus claim 9" should read, --The apparatus of claim 9--;

Column 12, Claim 25

Line 5, "The apparatus of claim 18" should read, --The apparatus of claim 19--.

Signed and Sealed this
Fourth Day of March, 2014

Michelle K. Lee
*Deputy Director of the United States Patent and Trademark Office*